/ US 9,129,748 B2 /

(12) United States Patent
Hucker et al.

(10) Patent No.: US 9,129,748 B2
(45) Date of Patent: Sep. 8, 2015

(54) ELECTROSTATIC CAPACITOR DEVICE

(75) Inventors: Martyn John Hucker, Woolaston (GB); Michael Dunleavy, Bishopston (GB); Hazel Anne Dyke, Aust (GB); Amy Elizabeth Dyke, Aust (GB)

(73) Assignee: BAE SYSTEMS PLC, London (GB)

( * ) Notice: Subject to any disclaimer, the term of this patent is extended or adjusted under 35 U.S.C. 154(b) by 65 days.

(21) Appl. No.: 13/577,406

(22) PCT Filed: Feb. 9, 2011

(86) PCT No.: PCT/GB2011/050220
§ 371 (c)(1),
(2), (4) Date: Aug. 6, 2012

(87) PCT Pub. No.: WO2011/098796
PCT Pub. Date: Aug. 18, 2011

(65) Prior Publication Data
US 2012/0314337 A1  Dec. 13, 2012

(30) Foreign Application Priority Data

Feb. 9, 2010 (GB) .................................. 1002038.6

(51) Int. Cl.
*H01G 4/005* (2006.01)
*B32B 27/04* (2006.01)
*H01G 9/048* (2006.01)
*H01G 4/01* (2006.01)
*H01G 11/26* (2013.01)
*H01G 11/30* (2013.01)
*H01G 11/40* (2013.01)

(52) U.S. Cl.
CPC .................. *H01G 9/048* (2013.01); *H01G 4/01* (2013.01); *H01G 11/26* (2013.01); *H01G 11/30* (2013.01); *H01G 11/40* (2013.01); H01G 4/005 (2013.01); Y02E 60/13 (2013.01); Y10T 156/10 (2015.01)

(58) Field of Classification Search
CPC ......... H01G 4/30; H01G 2/065; H01G 4/008; H01G 4/005; H01G 4/40; H01G 9/042; H01G 4/01
USPC ..................... 361/303, 301.4, 305; 428/297.4
See application file for complete search history.

(56) References Cited

U.S. PATENT DOCUMENTS

| 4,737,889 A | 4/1988 | Nishino et al. |
| 5,621,607 A | 4/1997 | Farahmandi et al. |
| 5,776,633 A | 7/1998 | Mrotek et al. |

(Continued)

FOREIGN PATENT DOCUMENTS

| EP | 0421881 | * 10/1990 |
| EP | 1 878 816 A1 | 1/2008 |

(Continued)

OTHER PUBLICATIONS

Partial English Language Translation of EP 0421881.*

(Continued)

*Primary Examiner* — Dion R Ferguson
(74) *Attorney, Agent, or Firm* — Buchanan Ingersoll & Rooney PC

(57) ABSTRACT

An electrostatic capacitor device is disclosed including first and second spaced apart electrode structures separated by a dielectric structure in which the first and second electrode structures are each formed from a composite material which includes electrically conductive fibers in a binder matrix.

20 Claims, 1 Drawing Sheet

(56) References Cited

U.S. PATENT DOCUMENTS

| | | | |
|---|---|---|---|
| 5,777,428 | A | 7/1998 | Farahmandi et al. |
| 5,862,035 | A | 1/1999 | Farahmandi et al. |
| 6,031,711 | A | 2/2000 | Tennent et al. |
| 6,059,847 | A | 5/2000 | Farahmandi et al. |
| 6,414,836 | B1 | 7/2002 | Tennent et al. |
| 7,864,505 | B1 * | 1/2011 | O'Brien et al. ............... 361/311 |
| 2003/0169558 | A1 | 9/2003 | Olson et al. |
| 2006/0221547 | A1 * | 10/2006 | Miura et al. .................. 361/305 |
| 2009/0263642 | A1 | 10/2009 | Handa et al. |
| 2009/0294022 | A1 | 12/2009 | Hayes et al. |
| 2012/0320497 | A1 * | 12/2012 | Ehrenberg .................... 361/525 |

FOREIGN PATENT DOCUMENTS

| | | |
|---|---|---|
| EP | 1 950 768 A1 | 7/2008 |
| GB | 2 399 938 A | 9/2004 |
| GB | 2 421 952 A | 7/2006 |
| JP | 56-068166 A | 6/1981 |
| JP | 2009-071324 A | 4/2009 |
| WO | WO 2004/094764 A2 | 11/2004 |
| WO | WO 2007/126282 A2 | 11/2007 |
| WO | WO 2009/091102 A1 | 7/2009 |

OTHER PUBLICATIONS

International Search Report (PCT/ISA/210) issued on May 26, 2011, by the British Patent Office as the International Searching Authority for International Application No. PCT/GB2011/050220.

Search Report issued on Apr. 14, 2010, by the British Patent Office for Application No. 1002038.6.

Notification Concerning Transmittal of International Preliminary Report on Patentability (Form PCT/IB/326) and the Written Opinion of the International Searching Authority (Form PCT/ISA/237) dated Aug. 23, 2012, issued in corresponding International Application No. PCT/GB2011/050220. (8 pages).

* cited by examiner

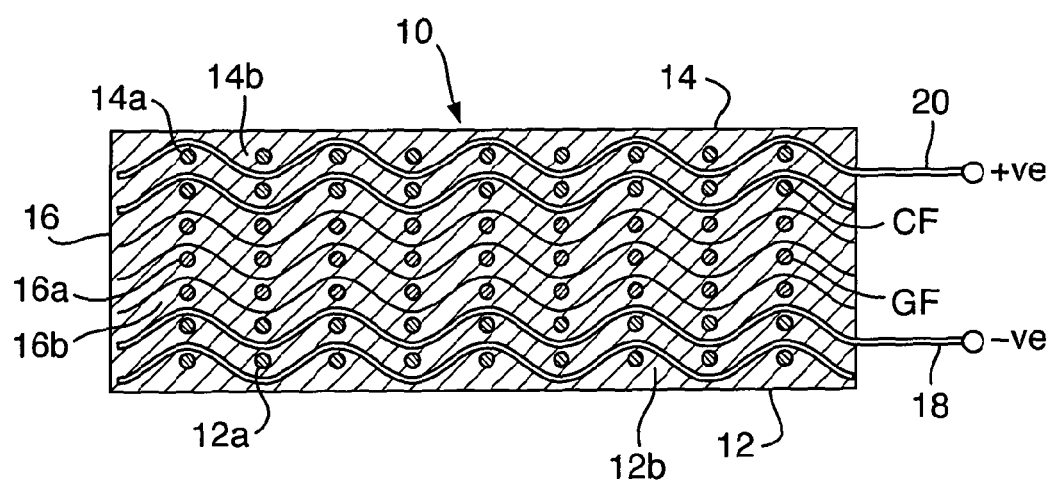

ELECTROSTATIC CAPACITOR DEVICE

Supercapacitors (also known as electric double-layer capacitors, electrochemical double-layer capacitors, and ultracapacitors) are well known electrical energy storage devices which are currently of much interest. Supercapacitors use ionic polarisation to provide an electrochemical double layer, and typically this is achieved through the use of solid polymer electrolyte (SPE) as a separator layer to support ion conduction. However, supercapacitors commonly suffer from structural drawbacks; in particular, these devices can be rather floppy. It is difficult to provide a supercapacitor having both good electrical properties and good structural stiffness. At least in part this is due to the relatively poor mechanical properties of current SPE's. A further drawback is that operating voltages are low due to oxidation reactions occurring at around 1-2V. A further drawback still is that device responsiveness is not good since it is determined by ion mobilities.

The present invention addresses the above described drawbacks and provides alternative electrical energy storage devices to supercapacitors which have improved structural properties and/or improved device gravimetric or volumetric efficiency in terms of specific energy (Watt-hours per kilogram) or energy density (Watt-hours per liter).

According to a first aspect of the invention there is provided an electrostatic capacitor device including first and second spaced apart electrode structures separated by a dielectric structure in which the first and second electrode structures are each formed from a composite material which includes electrically conductive fibres in a binder matrix.

In this way it is possible to provide a 'structural' electrostatic capacitor, in which fibre reinforced components provide a dual role by functioning as active electrical components and as a structural feature of the capacitor, providing advantageous mechanical properties and/or device performance properties. For example, conventional capacitors require additional support structures, such as casing and packaging, which from an operational point of view are wholly parasitic. The present inventors have recognised that this reduces the volumetric and/or gravimetric efficiency of conventional devices. In the present invention active electrical components are multi-functional since they can also perform a structural role as, for example, load bearing, protective or otherwise provide physically robust elements.

Preferably, the dielectric structure is formed from a composite material which includes electrically insulating fibres in a binder matrix. The electrically insulating fibres may be glass, polymer, ceramic or textile fibres. Examples of suitable electrically insulating fibres include E-glass fabric and silicon carbide fibres. Examples of textile fibres include natural fibres such as cotton, and synthetic fibres which are typically polymer fibres such as Nylon® and polyester. The thickness of the dielectric structure may be conveniently varied in order to provide desired mechanical and electrical properties. For example, greater thicknesses may be used to provide an increased breakdown voltage, whereas lesser thicknesses may be used to provide increased capacitance.

The dielectric structure may be formed from one or more layers. Variation of the number of layers is one way in which the thickness of the dielectric structure may be varied.

The first and second electrode structures and the dielectric structure may be formed with a common binder matrix thereby providing a monolithic structure.

The electrically conductive fibres of the first and second electrode structures may include carbon fibres.

The electrically conductive fibres of the first and second electrode structures may include fibres having a conductive coating. The fibres having a conductive coating may include carbon fibres and/or electrically insulating fibres. Examples of electrically insulating fibres include glass, polymer and ceramic fibres such as silicon carbide fibres, also textile fibres. Examples of textile fibres include natural fibres such as cotton, and synthetic fibres which are typically polymer fibres such as Nylon® and polyester.

Preferably, where the electrically conductive fibres of the first and second electrode structures include fibres having a conductive coating, these fibres are metallised fibres, such as nickel coated fibres. However, other conductive coatings might be used.

The electrically conductive fibres of the first and second electrode structures may be in the form of a woven fabric or may be a non crimp fabric or "unidirectional".

At least one of the first and second electrode structures may be formed from a composite material which further includes a filler material, thereby providing improved capacitance and/or structural properties. The filler material may be a ceramic powder which provides improved capacitance, such as barium titanate powder or a Perovskite ceramic powder.

At least one of the first and second electrode structures and the dielectric layer may be formed from a composite material which includes electrically insulating polymer, ceramic or glass based binder matrix. The electrically insulating binder matrix material may be an epoxy resin. Other structural resins, such as polyester resin, may be used. An elastomeric binder matrix may also be used. In this way, a flexible electrostatic capacitor device can be provided, particularly if textile fibres are used in the manufacture of the device.

Embodiments which utilise textile fibres (as electrically insulating fibres or as a component part of electrically conductive fibres) can be included in items of clothing and other textile products. Electrostatic capacitors of this type may be attached to an item of clothing (such as by sewing) or may be an integral part of an item of clothing (such as by being woven into the item of clothing).

The electrostatic capacitor device may include a plurality of device units, in which each unit includes first and second spaced apart electrode structures separated by a dielectric structure, the first and second electrode structures each being formed from a composite material which includes electrically conductive fibres in a binder matrix. In this way, multiple electrode devices can be provided, which may be interdigitated, multilayered or spatially distributed.

According to a second aspect of the invention there is provided a method of manufacturing an electrostatic capacitor device including first and second spaced apart electrode structures separated by a dielectric structure; the method including the steps of forming the first and second electrode structures from a composite material by including electrically conductive fibres in a binder matrix.

Whilst the invention has been described above, it extends to any inventive combination of the features set out above, or in the following description, drawing or claims.

BRIEF DESCRIPTION OF THE DRAWING

FIG. 1 illustrates an example of an electrostatic capacitor.

Embodiments of electrostatic capacitor devices in accordance with the invention will now be described with reference to the accompanying drawing, which shows a cross sectional side view of an electrostatic capacitor device of the invention.

The invention provides electrostatic capacitors formed at least in part from composite materials, thereby imparting desired structural properties. The FIGURE shows an example of an electrostatic capacitor of the invention, depicted generally at 10, comprising a first electrode structure 12 which is spaced apart from a second electrode structure 14 by a dielectric structure 16. The first and second electrode structures may be connected to suitable electrode contacts 18, 20 to permit charging and discharging of the capacitor in the usual manner.

Each of the first and second electrode structures 12, 14 and the dielectric structure 16 are formed as a composite material comprising suitable fibres in a binder matrix. The first and second electrode structures 12, 14 comprise electrically conductive fibres 12a, 14a in respective binder matrices 12b, 14b. The dielectric structure 16 comprises electrically insulating fibres 16a in a binder matrix 16b.

In a representative example, epoxy resin is used as the binder matrix throughout the device, E-glass plain wave fabric is used as the electrically insulating fibre in the dielectric structure 16, and carbon fibre is used in the first and second electrode structures 12, 14. Improvements may be possible if an electrically insulating fibre of higher permittivity, such as silicon carbide, is used. This has the further potential advantage of being mechanically stiffer than glass. Alternatively, one or more textile fibres may be used to provide a more flexible device which might be incorporated into an item of clothing. Textile fibres having a conductive coating might be used in the first and second electrode structures, and an elastomeric binder might be utilised to confer further mechanical flexibility.

Various additives can be included in the binder of any of the layers in order to improve a desired property of the device. Additive particulates can be used to improve structural properties. Highly advantageously, the use of a high permittivity additive such as a high permittivity ceramic additive in the dielectric structure can provide an enhanced capacitance. For example, the embodiment shown in the FIGURE was varied by introducing fine barium titanate into the matrix of the dielectric structure. This was found to provide a five fold increase in capacitance.

The capacitor can be manufactured in different ways. For example, it is possible to manufacture each of the first and second electrode structures and the dielectric structure separately, and subsequently bond these structures together. Alternatively, each structure may be produced separately, but with partial cure of the epoxy resin binder so that the structures can be conveniently bonded together. In a further embodiment, the entire capacitor structure of the first and second electrode structures and the dielectric structure is formed with a common binder, for example in a wet lay up process, to provide a 'monolithic' device structure.

The invention permits electrostatic capacitors to be produced which have excellent structural properties. Another advantage of the present invention in comparison to supercapacitors is that much higher operating voltages can be supported. The energy (E) stored by a capacitor is given by the equation $E=(1/2)CV^2$ where V is the voltage the capacitor is charged to. The capacitance per unit dimension of electrostatic capacitors is lower for electrostatic capacitors in comparison to supercapacitors, but this can be outweighed if a higher operating voltage is achieved. For example, a 1 μF capacitor charged to 1000V holds the same amount of energy as a 1 F capacitor charged to 1V. The maximum operating voltages achievable with supercapacitors are less than 4V, whereas operating voltages of 10 kV or greater are possible with electrostatic capacitors. Furthermore, charging and discharging rates for electrostatic capacitors can be significantly greater than for supercapacitors. The upshot is that electrostatic capacitors having similar energy densities to supercapacitors but higher power densities can be produced. Although not limited in this regard, the invention is very suitable for high voltage, high power applications.

Numerous variations are possible. For example, it is possible to provide interdigitated capacitor device structures to increase capacitance, stacked devices comprised of multiple layers of cells and spatially distributed cells.

The invention claimed is:

1. An electrostatic capacitor device, comprising:
   first and second spaced apart electrode structures separated by a dielectric structure;
   wherein the first and second electrode structures are each formed from a composite material which includes electrically conductive fibres in a binder matrix, and
   wherein said composite material is electrically conductive and has a structural, load-bearing function that remains stiff while entirely supporting a weight of the electrostatic capacitor device.

2. A device according to claim 1, wherein the dielectric structure is formed from a composite material which includes electrically insulating fibres in a binder matrix.

3. A device according to claim 2, wherein the first and second electrode structures and the dielectric structure are formed with a common binder matrix thereby providing a monolithic structure.

4. A device according to claim 1, wherein the electrically conductive fibres of the first and second electrode structures include carbon fibres.

5. A device according to claim 1, wherein the electrically conductive fibres of the first and second electrode structures include fibres having a conductive coating.

6. A device according to claim 5, wherein the fibres having a conductive coating include carbon fibres and/or electrically insulating fibres.

7. A device according to claim 5, wherein the fibres having a conductive coating are metallised fibres.

8. A device according to claim 1, wherein the electrically conductive fibres of the first and second electrode structures are in the form of a woven fabric.

9. A device according to claim 1, wherein the electrically conductive fibres of the first and second electrode structures are in the form of non crimp fabric.

10. A device according to claim 1, wherein at least one of the first and second electrode structures is formed from a composite material which includes a filler material for providing improved capacitance and/or structural properties.

11. A device according to claim 10, wherein the filler material is a ceramic powder.

12. A device according to claim 11, wherein the ceramic powder is selected from a group consisting of: barium titanate powder and Perovskite ceramic powder.

13. A device according to claim 1, wherein at least one of the first and second electrode structures and the dielectric layer is formed from a composite material which includes one of: electrically insulating polymer, ceramic and glass based binder matrix.

14. A device according to claim 13, wherein the electrically insulating binder matrix material is an epoxy resin.

15. A device according to claim 13, wherein the electrically insulating binder matrix material is an elastomer.

16. A device according to claim 1 comprising:
   a number of device units, wherein each device unit includes first and second spaced apart electrode structures separated by a dielectric structure, the first and second electrode structures each being formed from a composite material which includes electrically conductive fibres in a binder matrix.

17. A method of manufacturing an electrostatic capacitor device comprising:
  forming first and second electrode structures from a composite material by including electrically conductive fibres in a binder matrix;
  wherein said composite material is electrically conductive and has a structural, load-bearing function that remains stiff while entirely supporting a weight of the electrostatic capacitor device; and
  separating the first and second electrode structures by a dielectric structure.

18. A device according to claim 3, wherein the electrically conductive fibres of the first and second electrode structures include fibres having a conductive coating.

19. A device according to claim 18, wherein at least one of the first and second electrode structures is formed from a composite material which includes a filler material for providing improved capacitance and/or structural properties.

20. A device according to claim 19 comprising:
  a number of device units, wherein each device unit includes first and second spaced apart electrode structures separated by a dielectric structure, the first and second electrode structures each being formed from a composite material which includes electrically conductive fibres in a binder matrix.

\* \* \* \* \*